June 23, 1953 C. C. WILSON ET AL 2,642,664
APPARATUS FOR TESTING THICKNESS OF TEXTILE LAP
Filed March 9, 1951 3 Sheets-Sheet 1
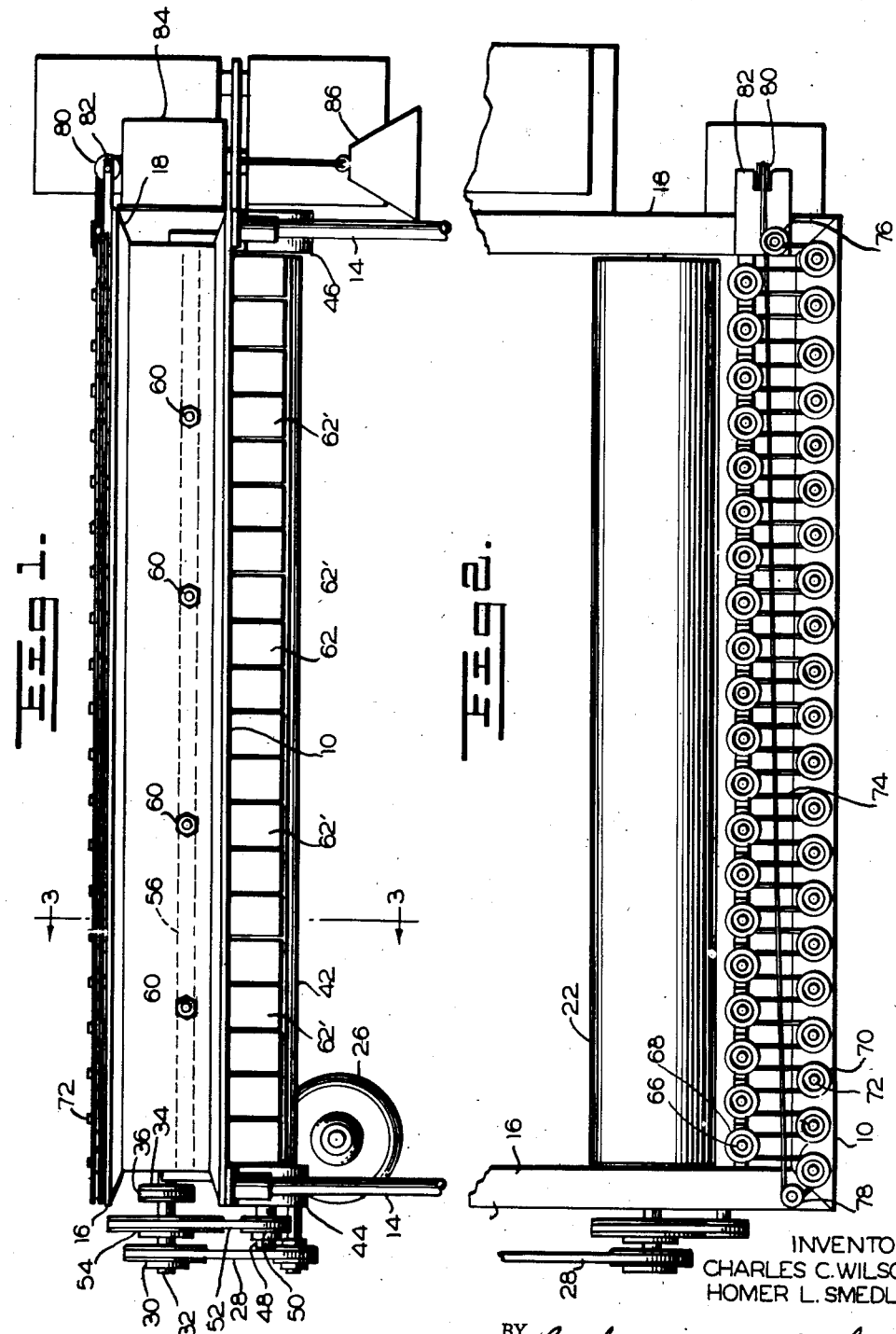
INVENTORS
CHARLES C. WILSON
HOMER L. SMEDLEY
BY Cushman, Darby & Cushman
ATTORNEY

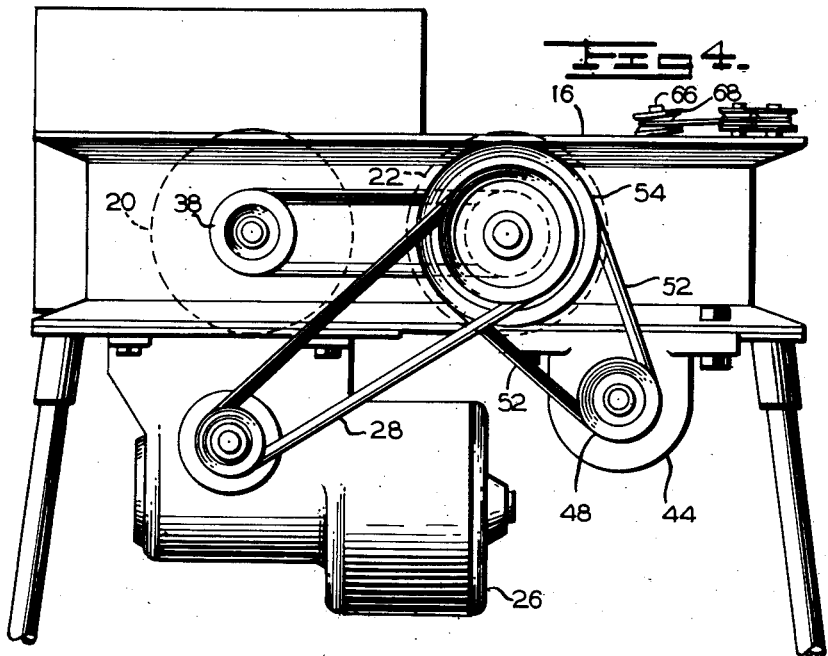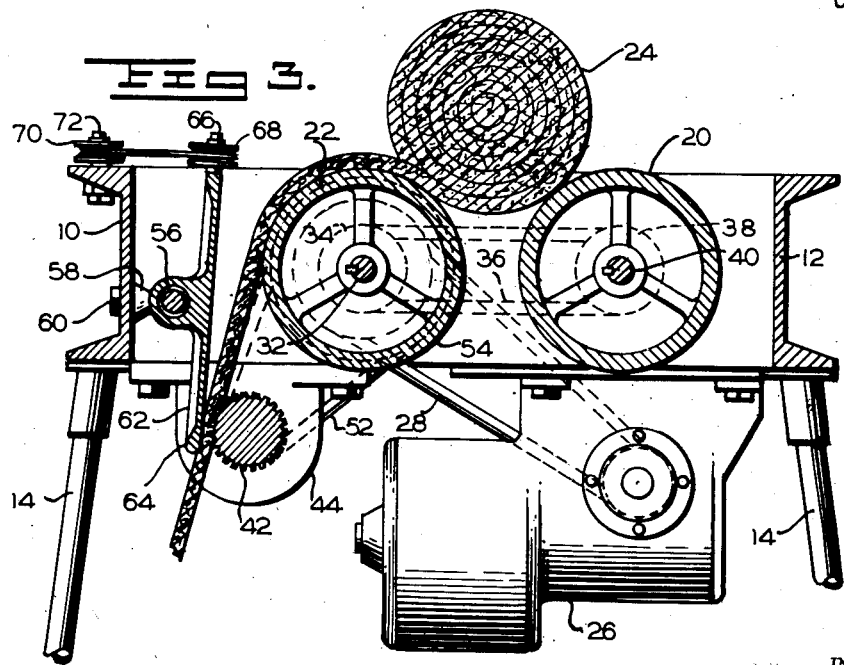

June 23, 1953  C. C. WILSON ET AL  2,642,664
APPARATUS FOR TESTING THICKNESS OF TEXTILE LAP
Filed March 9, 1951  3 Sheets-Sheet 3
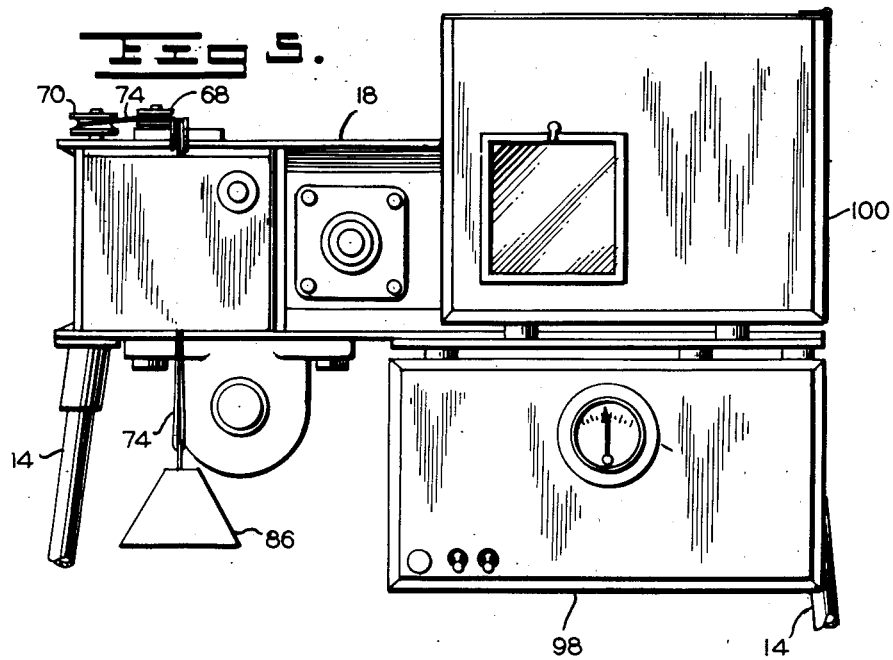
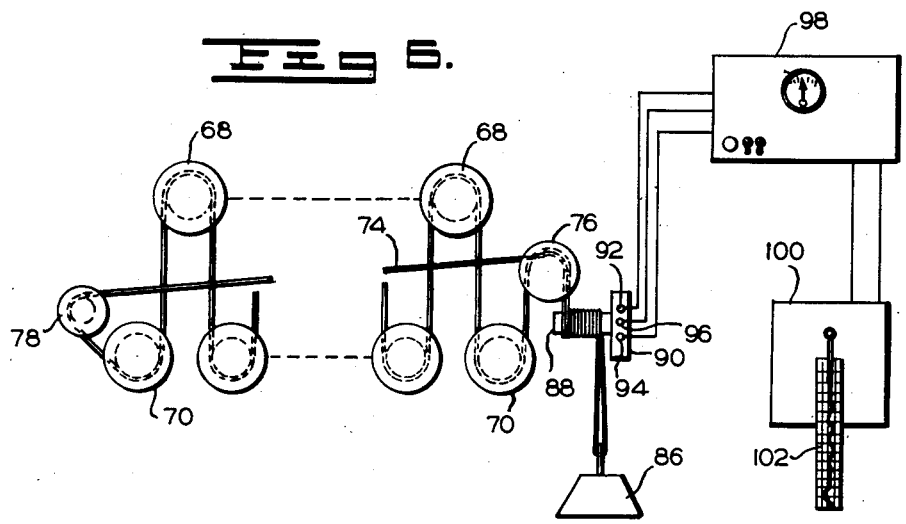
INVENTORS
CHALES C. WILSON
HOMER L. SMEDLEY
BY Cushman, Darby & Cushman
ATTORNEYS Patented June 23, 1953

2,642,664

UNITED STATES PATENT OFFICE 2,642,664

APPARATUS FOR TESTING THICKNESS OF TEXTILE LAP

Charles Calvin Wilson, Lanett, and Homer Lee Smedley, Shawmut, Ala., assignors to West Point Manufacturing Company, West Point, Ga., a corporation of Alabama Application March 9, 1951, Serial No. 214,721

8 Claims. (Cl. 33—148)

1

This invention relates to apparatus for measuring the thickness of material such as textile lap.

Briefly, the invention relates to apparatus for measuring the short period variations in the average thickness of textile lap or the like. The apparatus embodying the invention comprises means to move a length of lap of given material adjacent a plurality of thickness sensing devices positioned widthwise of the moving lap and providing novel means for measuring the average of the thicknesses measured by the individual thickness sensing means.

A primary object of the invention is therefore to provide improved means for measuring the average thickness of textile lap and the like.

A further object of the invention is to provide improved means for measuring the average thickness of textile lap and the like in which variation in thickness of any portion of the lap being measured will undergo substantially the same resistance in the thickness averaging arrangement.

Further objects and the entire scope of the invention will become more fully apparent from the following detailed description and from the appended claims.

A complete understanding of the invention may be had with reference to the accompanying drawings in which:

Figure 1 shows a side elevational view of apparatus embodying the invention.

Figure 2 shows a plane view of the apparatus of Figure 1.

Figure 3 is a cross sectional view taken along line 3—3 of Figure 1.

Figure 4 is an end view of the apparatus of Figure 1 showing the left-hand end as viewed in Figure 1.

Figure 5 is an end view of the right-hand end as viewed in Figure 1.

Figure 6 is a diagrammatic illustration of the thickness averaging arrangment combined with electrical circuit means for indicating the measured thickness.

Referring now primarily to Figures 1-3 channel members 10 and 12 form front and rear sides respectively of a frame structure supported upon downwardly extending legs 14. Channel members 16 and 18 are joined with the ends of channel members 10 and 12 to complete the supporting frame upon which the remainder of the apparatus is supported.

Suitably journalled in the end channels 16 and 18 are two parallel supporting drums 20 and

2

22 which are adapted to be rotated in unison to support a roll of textile lap or the like 24. Rolls 20 and 22 are arranged to be driven by a suitable gear reduction motor 26 by means of belt 28. Belt 28 drives drum 22 by means of pulley 30 mounted upon shaft 32. Shaft 32 is extended a sufficient distance beyond the channel 16 to permit clearance of the belt 28. Also mounted on shaft 32 is a pulley 34 which serves to drive drum 20 by means of belt 36 which is driven by pulley 34 on shaft 32 and which drives drum 20 by means of pulley 38 which is keyed to shaft 40 of drum 20.

Pulleys 30 and 34 are keyed to shaft 32.

In addition to drums 20 and 22 there is also rotatably mounted on the supporting framework a rotatable fluted roller 42. Roller 42 is suitable journalled in bearing brackets 44 and 46 which are mounted on the underside of channel members 16 and 18, respectively. The shaft of roller 42 is extended at its left-hand end as viewed in Figure 1 whereat the shaft is indicated by reference character 48. Keyed to the just-mentioned extension of shaft 48 is a pulley 50 which serves to drive roller 42 by means of a belt 52 which is driven by a pulley 54 also keyed to the previously mentioned shaft 32.

From the apparatus as thus far described it will be apparent that as belt 28 is operated from motor 26 in a counterclockwise direction, as viewed in Figure 3, drums 20 and 22 will be driven at uniform peripheral speed and the roll of lap 24 will tend to unroll. It will also be apparent that the fluted roller 42 will be driven in the same counterclockwise direction as drums 20 and 22 and by selection of suitable dimensions of the various pulleys the peripheral speed of roller 42 may be equal to the peripheral speed of drums 20 and 22.

Also mounted lengthwise of the framework structure is a shaft 56. The shaft 56 may have its ends suitably journalled in the end channels 16 and 18 and may also be supported intermediate its length by supporting posts 58 held in place by bolts 60. Pivotally mounted on shaft 56 are a plurality of thickness sensing feeler shoes 62. Referring to Figure 1 the feeler shoes 62 are of a width which is a small fraction of the total length of the drums 20 and 22 and, therefore, each individual feeler shoe will sense only a limited portion of the width of the lap 24 when the lap is trained downwardly over roller 42 to lie between the periphery of roller 42 and the lower extremity 64 of feeler shoes 62. Those feeler shoes which are positioned in alignment with the supporting posts 58 may be suitably bifurcated in their central portion to provide the space necessary for supporting posts 58 to support the shaft 56. In the drawings these feeler shoes are designated 62'.

The feeler shoes 62 extend upwardly above shaft 56 a distance sufficient to place the upper ends of the shoes substantially flush with the upper surfaces of channel members 10, 12, 16 and 18. At the top of each feeler shoe is mounted a stub shaft 66 upon which is rotatably mounted a pulley 68. Accordingly, it will be apparent that as lower end 64 of a feeler shoe 62 is moved toward and away from the surface of roller 42, by reason of changing thickness in the lap 24, the pulley 68 will be moved in the opposite horizontal direction a predetermined amount.

As viewed in Figure 2 the movable pulleys 68 are supplemented by a plurality of pulleys 70. Each of the pulleys 70 is rotatably mounted on stub shafts 72 which are suitably mounted in the upper flange of channel member 10. Stub shafts 72 are centered substantially mid-way between the stub shafts 66 of the movable pulleys and accordingly permit a flexible cable 74 to be trained alternately over a fixed pulley and then over a movable pulley. In addition to the just-mentioned fixed pulleys there are also provided fixed pulleys 76 and 78 mounted on channel members 18 and 16, respectively. Pulleys 76 and 78 are so mounted that the flexible cable 74 leaving the fixed pulleys 70 at the extreme ends of the group of fixed pulleys 70 may be suitably guided to and joined at a fixed pulley 80 which is suitably mounted on a plate 82 mounted on and extending from the upper flange channel member 18. The thus joined ends of cable 74 then pass through a motion detecting unit 84 (to be described more fully below) and then to a weight 86 which provides tension in the cable 74.

From the apparatus as thus far described it will be apparent that tension in the cable 74 will cause the lower ends 64 of each of the feeler shoes 62 to be urged toward the surface of fluted roller 42. Therefore with the lap 24 trained between the feeler shoe 62 and the roller 42 the ridges on fluted roller 42 will cause the lap to be moved downwardly as viewed in Figure 3. Inasmuch as drums 20 and 22 are driven at the same peripheral speed as roller 42, the lap will be fed to roller 42 at the proper speed and without introducing undesired tension in the lap. It will be further apparent that at any given moment of time the individual feeler shoe 62 positions movable pulley 68 in a position relative to the associated fixed pulleys 70 to indicate the thickness of lap in the area of the lap under the particular shoe end 64.

As has been stated above, the purpose of the apparatus is to obtain a measure of the average thickness of the lap widthwise of the lap. That is, it is the purpose of the apparatus to measure the average of the thicknesses being detected by the individual feeler shoes 64. It will be apparent from the apparatus as thus far described and as illustrated in the drawings, that the length of cable 74 between the fixed pulleys 76 and 78 will be an accurate indication of the average of the distances of the movable pulleys 68 from the fixed pulleys 70 and this in turn will be a representation of the average thickness of the lap. Referring now to Figure 6, the method of obtaining an indication and record of the average thickness will now be described. The joined ends of the cable 74 after being trained over pulley 80 (not shown in Figure 6) may be wrapped around a small drum 88 which is attached to the rotary element of a potentiometer 90. The potentiometer 90 may be of a type having an arcuate resistance coil having a potential placed there across from terminals 92 and 94, with the rotating arm tap available at terminal 96. The potential obtained at terminal 96 may then be amplified and/or rectified by suitable circuits at 98 and an output signal representing the position of the rotating arm of potentiometer 90 may be applied to any conventional recording apparatus 100 which will produce a written record 102 of the average thicknesses measured as the lap proceeds to move adjacent the feeler shoes 62.

By use of a closed loop of cable 74 the results obtained according to this invention are very much improved over results obtained using a cable which is attached at one end to a fixed point and is only movable at the other end to actuate indicating equipment. That is, it will be observed that cable 74 could terminate at fixed pulley 78 and be fixedly held and only the other end of cable 74, which passes over pulley 76, be trained over the drum 88 and tensioned by the weight 86. However, in this type of arrangement it will be apparent that if a feeler shoe near the fixed end of the cable is moved it will be required that all of the fixed and movable pulleys between the given shoe and the movable end of the cable must rotate. This will mean that the accumulated rotational resistance of the pulleys must be overcome as well as whatever resistance is offered by the flexing of the cables at each of the said remaining pulleys. However with a fixed end type arrangement if only a shoe 62 moves which is near the movable end of the cable then much less resistance will be encountered because the remaining shoes toward the fixed end of the cable will not undergo any movement whatsoever. Thus it will be obvious that instead of obtaining an accurate measurement of the thickness of a lap at a particular point the increased resistance may diminish the indicated change by reason of the increased pressure on the lap simply compressing the latter.

The present invention therefore is to be sharply distinguished from the above mentioned arrangement in that the movement of any given shoe 62 regardless of its position along the line of shoes, will cause the cable and pulleys to both sides of the given shoe to move substantially equally. In this manner movement of any shoe will be be met with a predetermined amount of resistance and whatever compression the lap will undergo will be the same under each shoe. As previously stated, the tension in cable 74 may be controlled by the weight 86. It will be apparent that basically a loop of cable 72 must be trained over the pulleys 68 and 70 with tension established in the cable 74 and with the further requirement that some point of the cable be capable of being moved a measurable distance in a direction tending to change the length of cable in that portion of the loop which is trained over the pulleys 68 and 70. Any convenient movement detecting means may be employed in place of the potentiometer 90.

In view of the fact that many other embodiments of the invention will occur to others upon reading the foregoing specification it is not intended that the detailed description given above in any way limit the scope of the invention. It is intended that the scope of the invention be only limited by the appended claims.

We claim:

1. In lap testing apparatus, means to measure the average thickness of a width of lap, said means comprising a plurality of feeler members movable in response to thickness of the lap, the feeler members being distributed widthwise of the lap, a closed loop of flexible cable, means mounted on each feeler member for receiving the flexible cable thereabout, a plurality of fixedly mounted means for receiving the flexible cable thereabout, a portion of the cable loop being threaded successively about a receiving means of a feeler member and about a fixedly mounted receiving means, and measuring means adapted to measure the length of cable in the said portion of the cable loop to provide a measure of the average thickness of the width of lap beneath the feeler members.

2. Apparatus as in claim 1 in which the cable receiving means comprise pulleys.

3. In lap testing apparatus, means to measure the average thickness of a width of lap, said means comprising a plurality of feeler members movable in response to thickness of the lap, the feeler members being distributed widthwise of the lap, a length of flexible cable having first and second ends, means mounted on each feeler member for receiving the flexible cable thereabout, a plurality of fixedly mounted means for receiving the flexible cable thereabout, the length of cable being threaded successively about a receiving means of a feeler member and about a fixedly mounted receiving means, and means for applying tension in unison to the first and second cable ends in a direction tending to shorten the portion of cable threaded between the fixed and movable receiving means, the arrangement being such that movement of a given feeler member receiving means will move the cable equally to both sides of the given receiving means.

4. In thickness averaging measuring apparatus of a type having a plurality of fixed and movable receiving means with a flexible cable trained thereover, means joining the ends of the cable for movement in unison in a direction tending to alter the length of cable trained over the said receiving means, and means responsive to movement of the said ends of the cable adapted to indicate the average movement of the movable receiving means.

5. In thickness averaging apparatus of a type having a plurality of fixed and movable receiving means with a portion of a closed loop of flexible cable trained thereover, means attached to a point of the loop and adapted to move the point in a direction which will change the length of cable in the said portion, and means responsive to movement of the said point of the cable and adapted to indicate the average movement of the movable receiving means.

6. In apparatus for measuring the average thickness widthwise of a length of textile lap or the like, a roller adapted to move the lap, the roller being positioned widthwise of the lap, a plurality of thickness sensing feeler means positioned along the roller and adjacent the surface thereof, each feeler means being provided with a pulley, a plurality of fixedly mounted pulleys, a flexible cable trained successively over the fixed pulleys and the pulleys mounted on the feeler means, the ends of the cable being attached to a force producing means to introduce tension into the cable, means to rotate the roller to move the lap adjacent the feeler means, and means to measure movement of the cable ends leading to the force producing means, the arrangement being such that the average thickness of the lap is indicated and an equal resistance to movement must be overcome by each feeler means.

7. In measuring apparatus, means for indicating the average position of at least two members movable with respect to a fixed member, said means comprising a cable receiving means on each movable member, at least one cable receiving means on the fixed member, a flexible cable having first and second ends and passed alternately over a cable receiving means mounted on one of said movable members and a cable receiving means mounted on the fixed member, to include all of the movably mounted cable receiving members, the cable ends being joined for movement together, and means connected with the cable ends to indicate the position of the said ends relative to the array of cable receiving members.

8. Apparatus as in claim 7 wherein the cable receiving means are pulleys.

CHARLES CALVIN WILSON.
HOMER LEE SMEDLEY.

References Cited in the file of this patent

FOREIGN PATENTS

| Number | Country | Date |
| --- | --- | --- |
| 575,627 | Germany | May 3, 1933 |